Sept. 13, 1938. W. HUCAL 2,130,012
MILLING MACHINE
Filed July 3, 1936 9 Sheets-Sheet 1
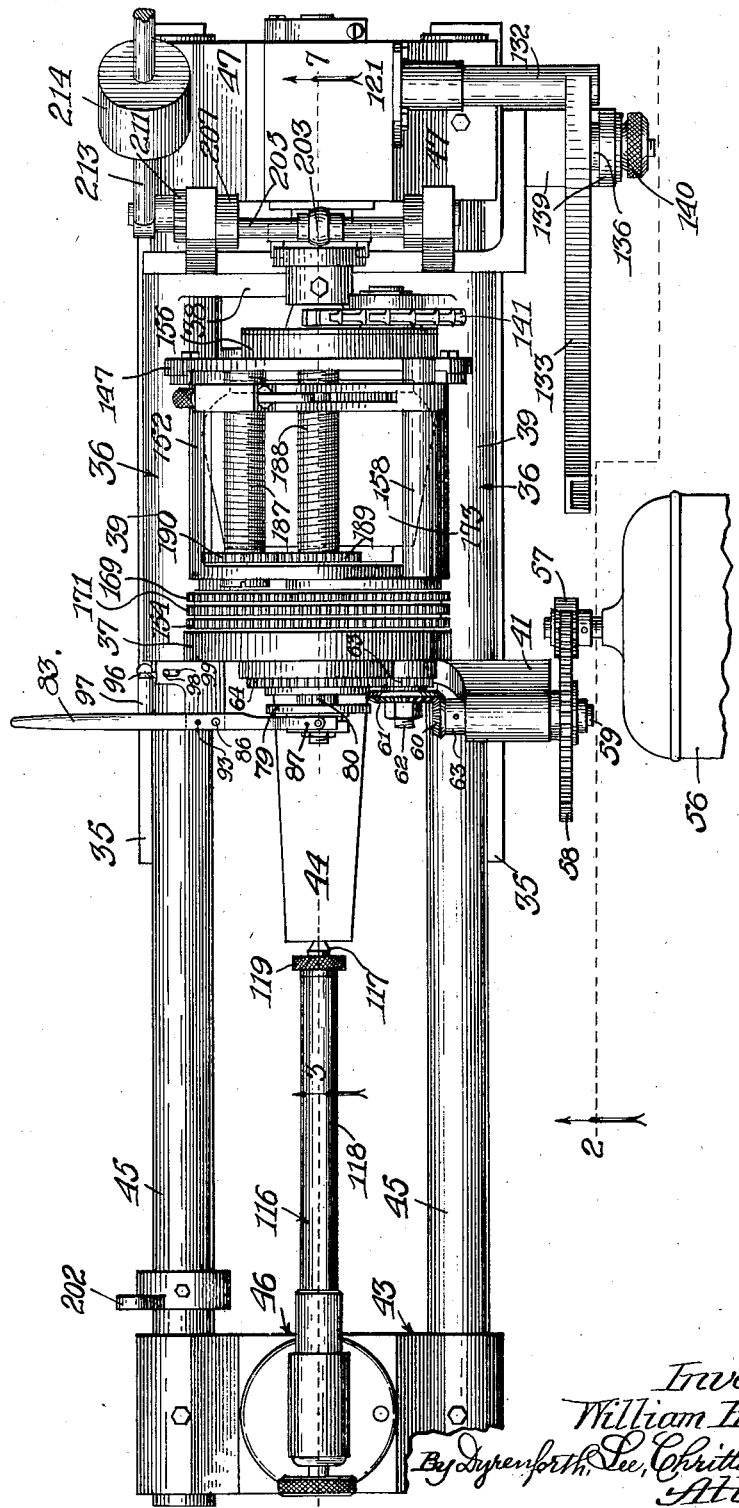

Sept. 13, 1938.  W. HUCAL  2,130,012
MILLING MACHINE
Filed July 3, 1936  9 Sheets-Sheet 2
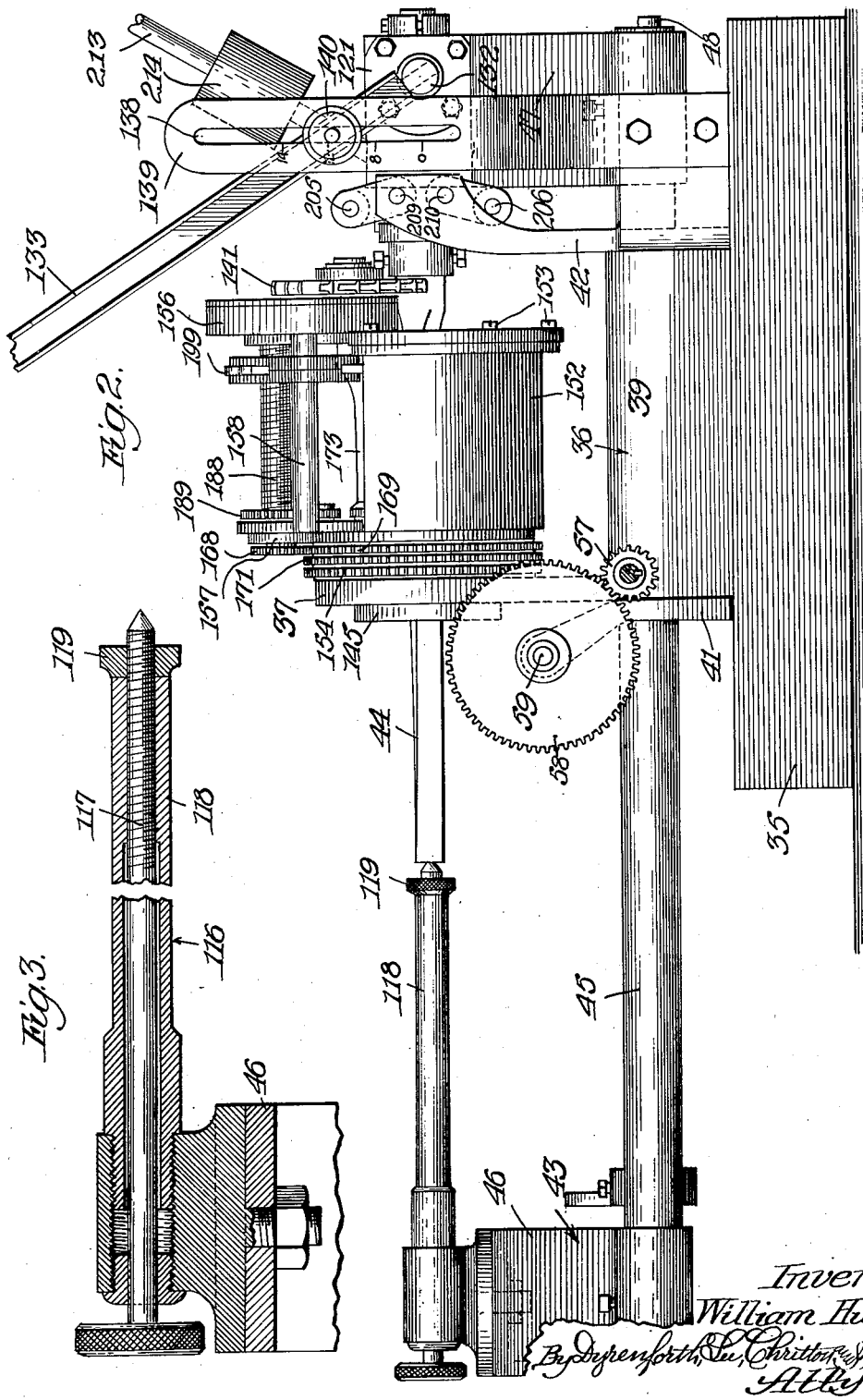

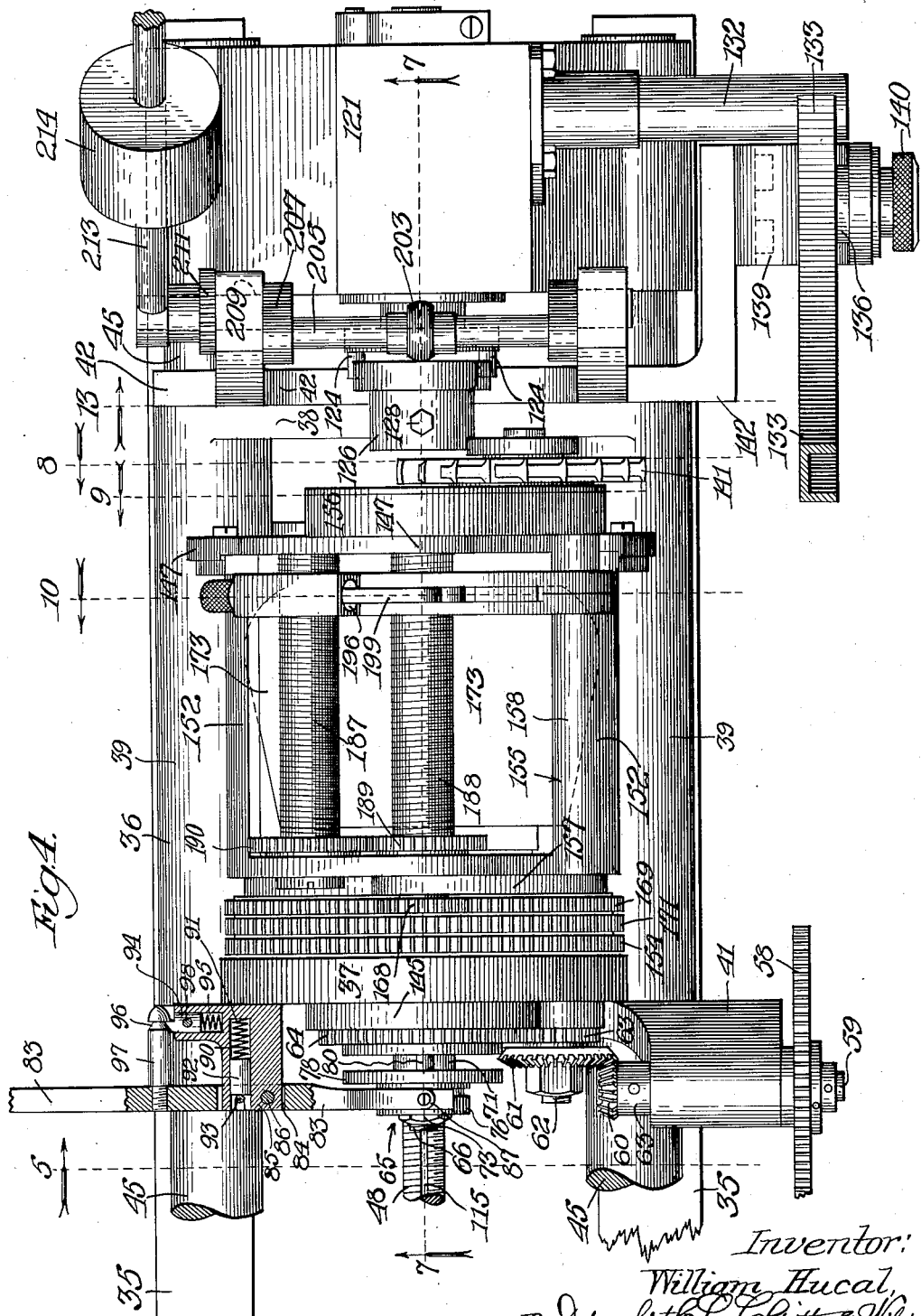

Sept. 13, 1938.　　　　W. HUCAL　　　　2,130,012
MILLING MACHINE
Filed July 3, 1936　　　　9 Sheets-Sheet 4
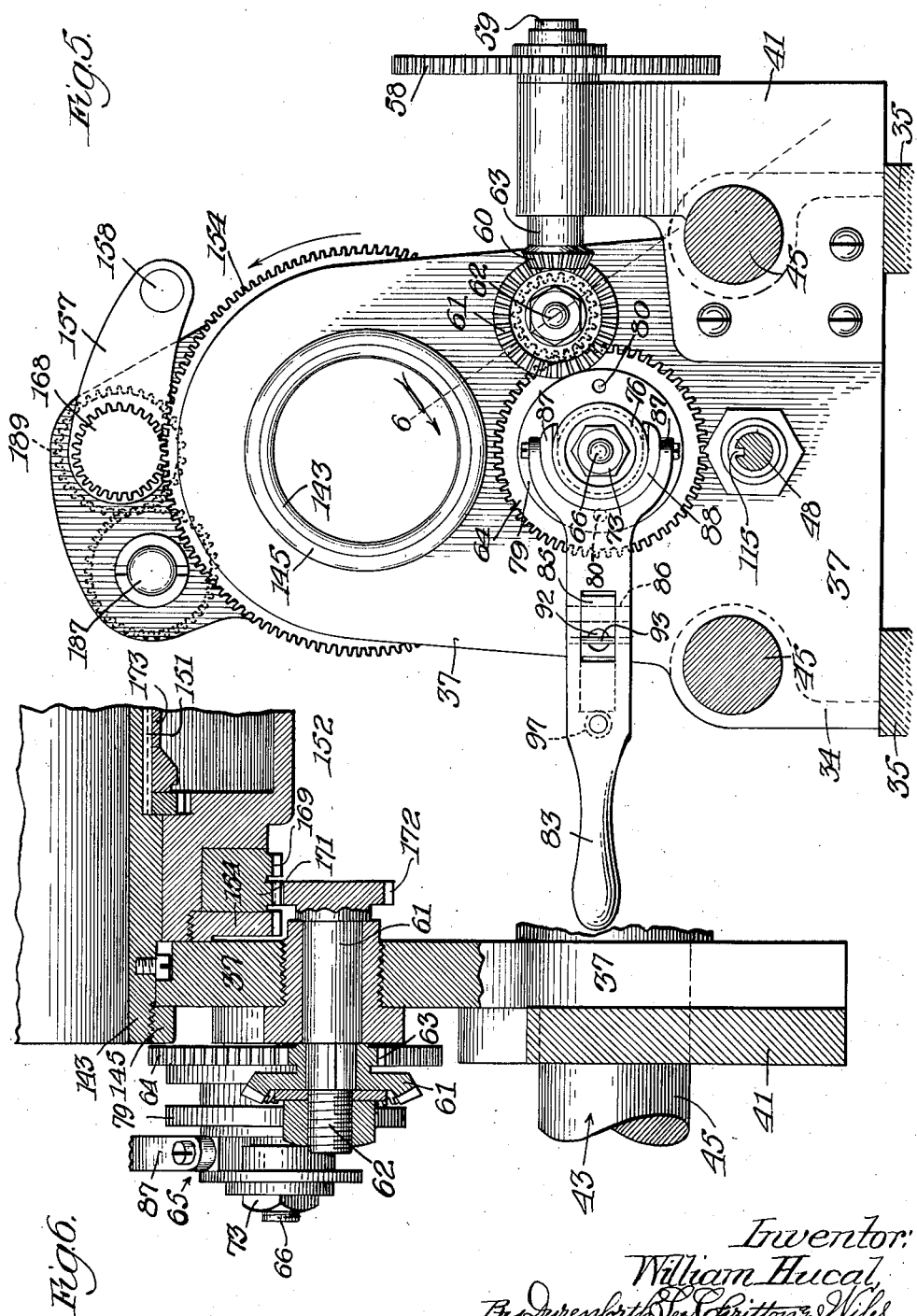

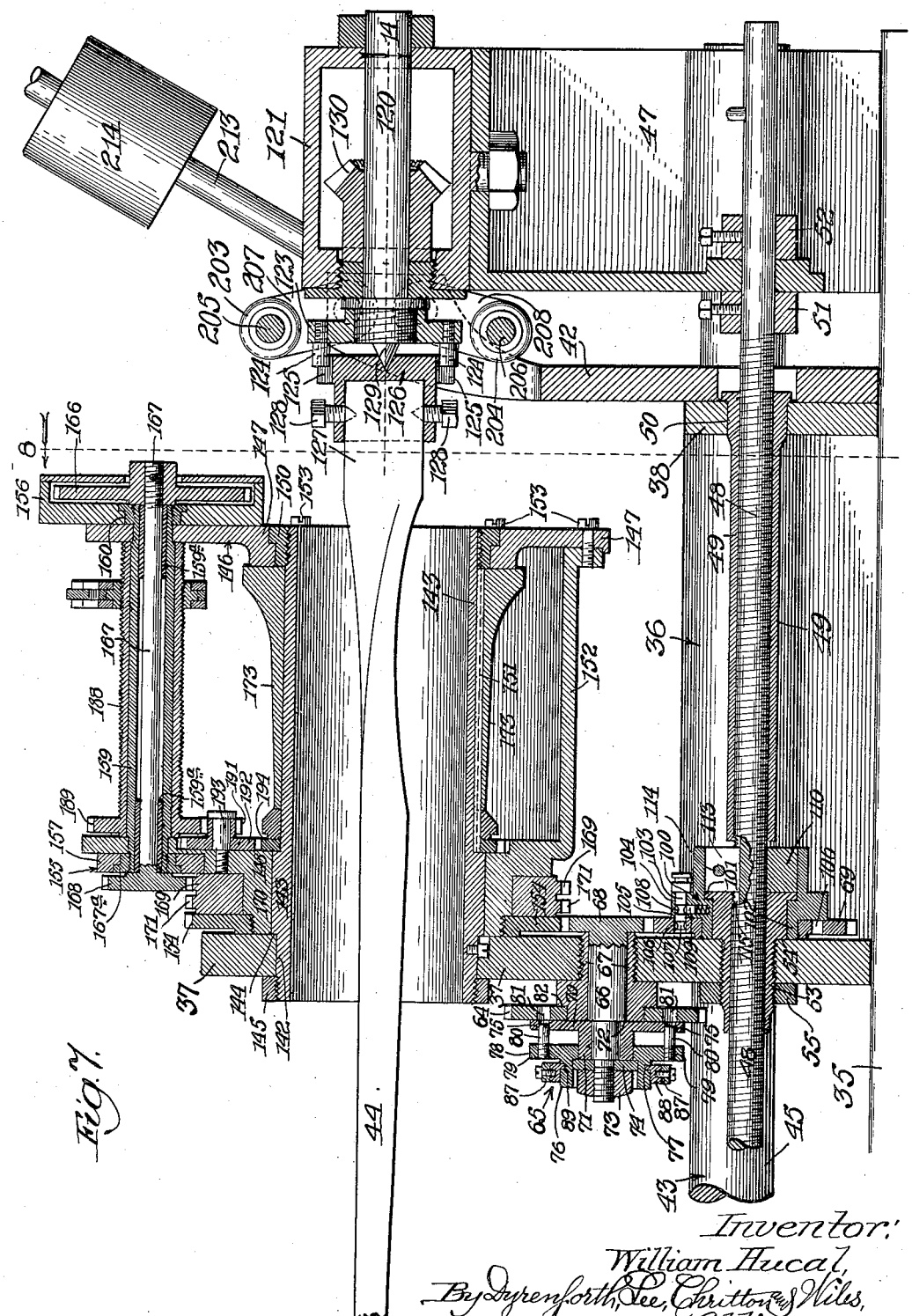

Sept. 13, 1938. W. HUCAL 2,130,012
MILLING MACHINE
Filed July 3, 1936 9 Sheets-Sheet 6
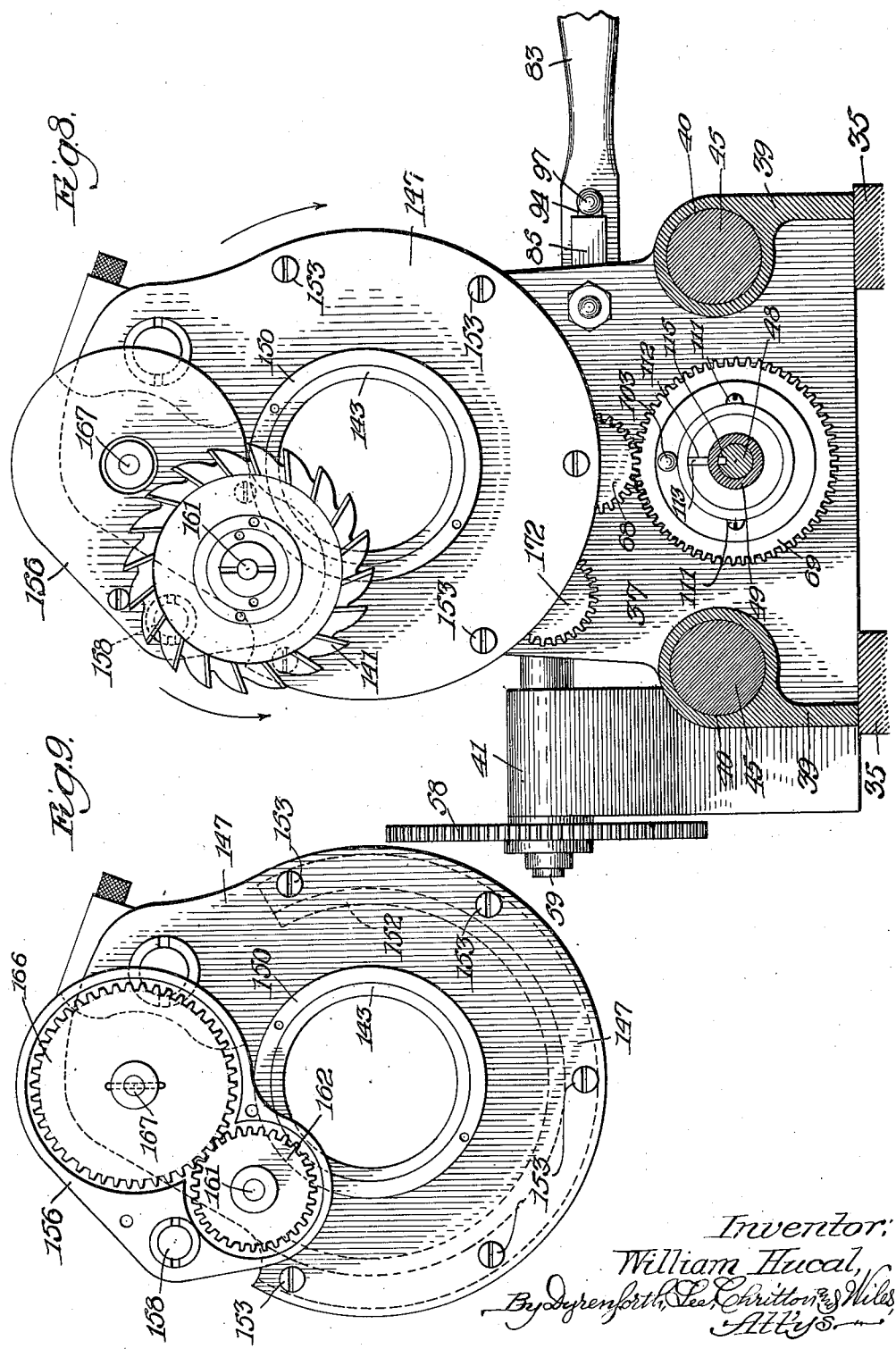
Inventor:
William Hucal,
By Dyrenforth, Lee, Chritton & Wiles
Att'ys

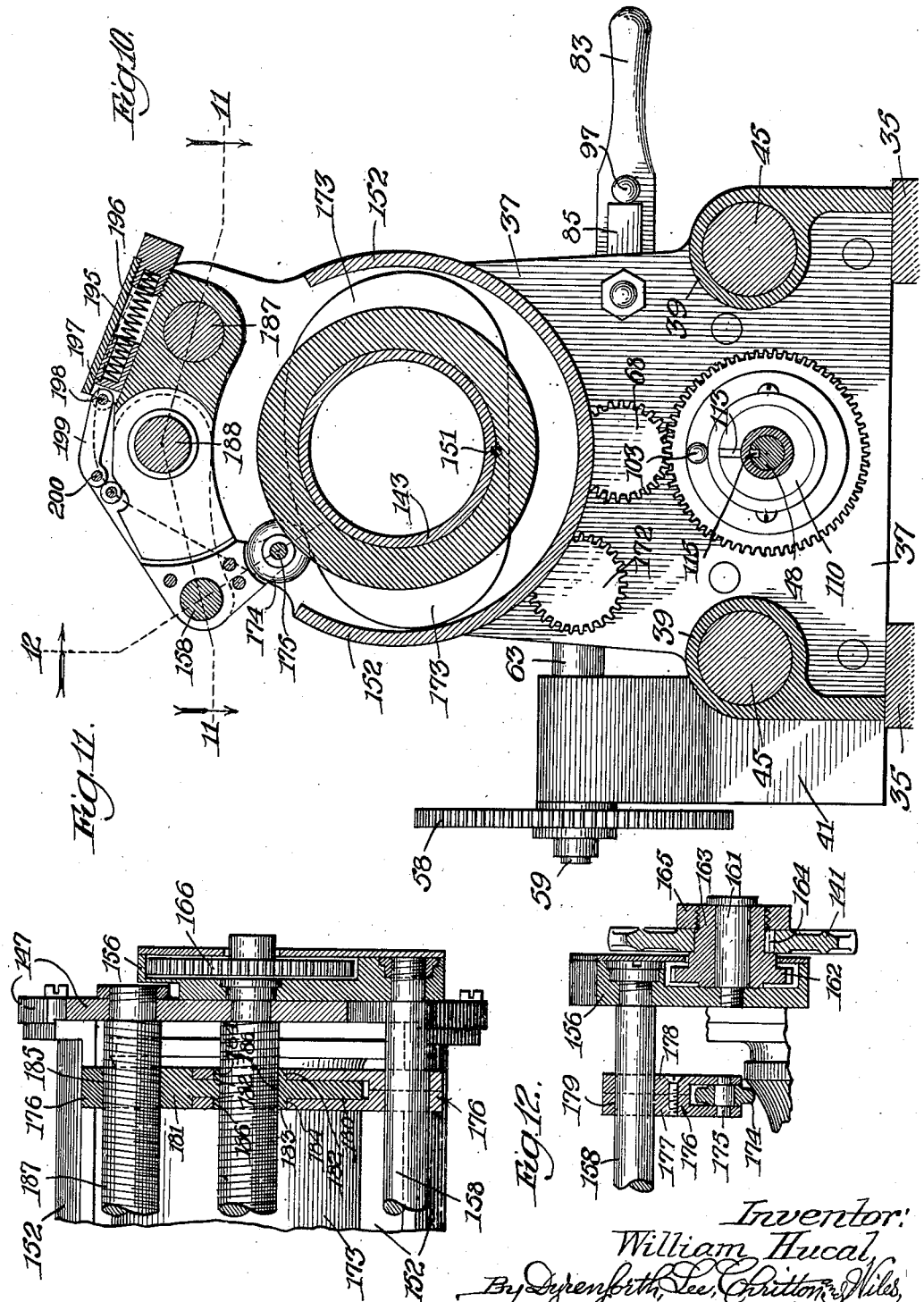

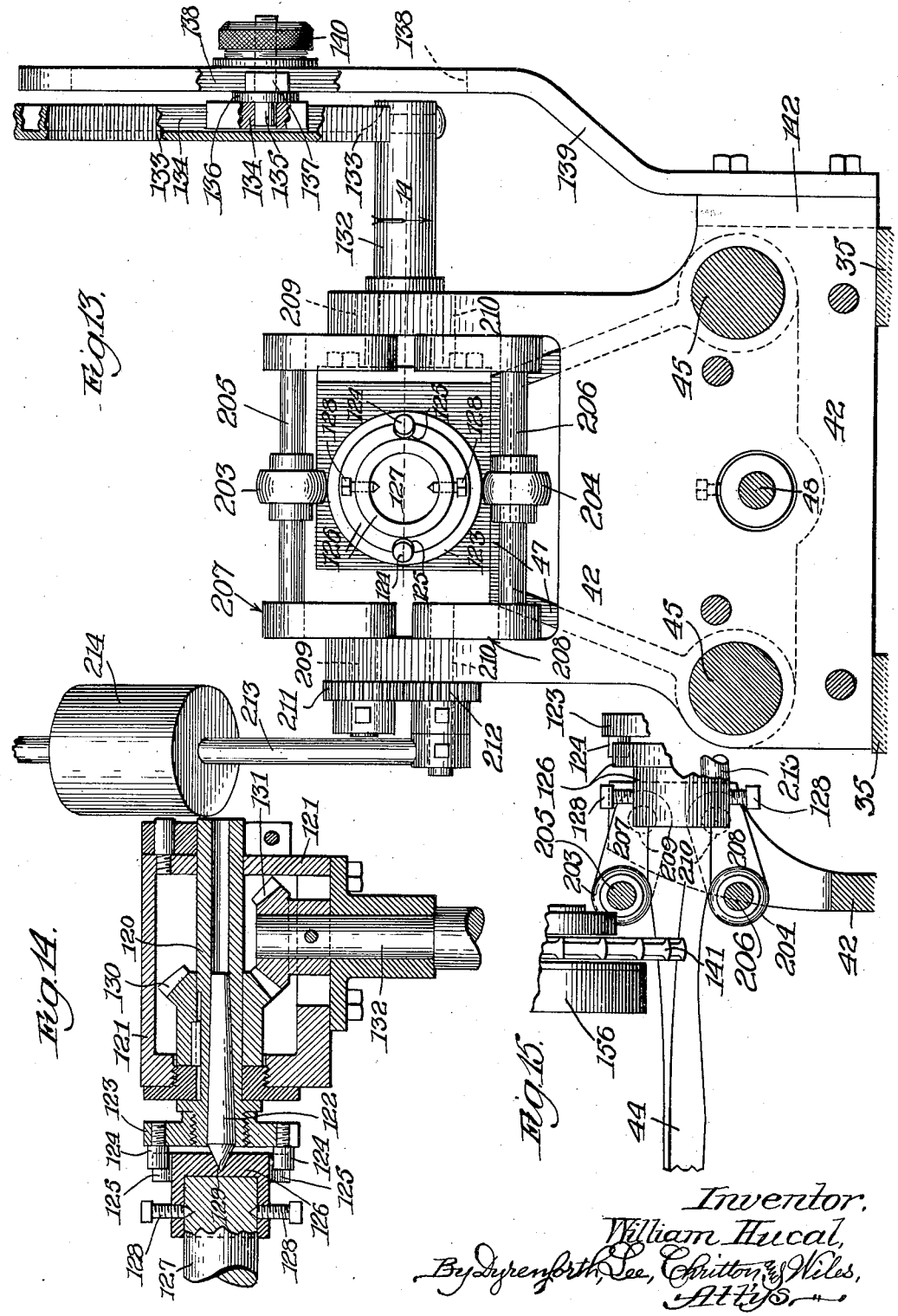

Sept. 13, 1938. W. HUCAL 2,130,012
MILLING MACHINE
Filed July 3, 1936 9 Sheets-Sheet 9
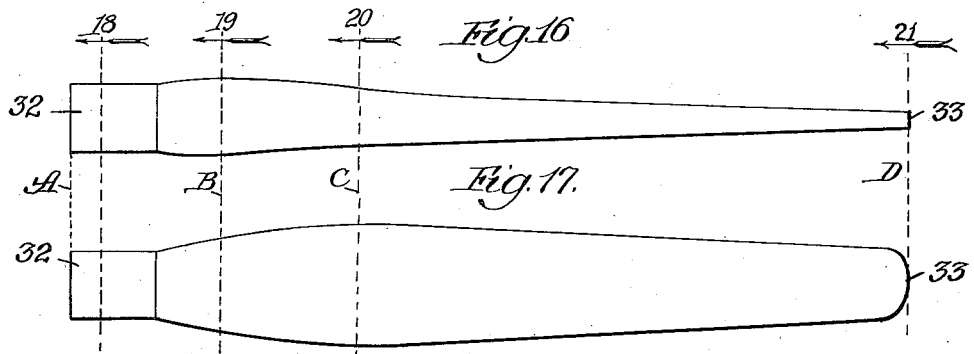
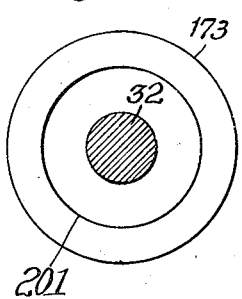
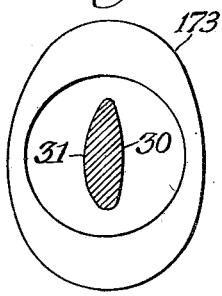
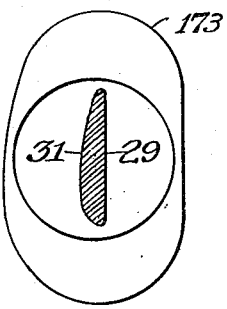
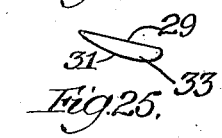
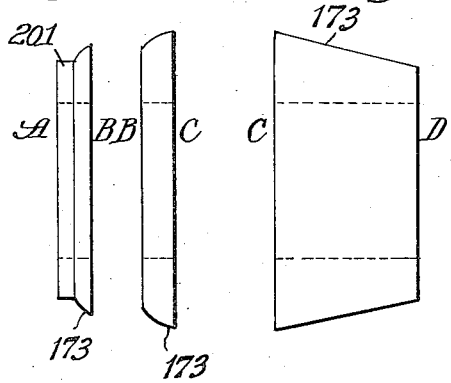
Inventor:
William Hucal,
By Dyrenforth, Lee, Chritton & Wiles,
Att'ys Patented Sept. 13, 1938

2,130,012

UNITED STATES PATENT OFFICE 2,130,012

MILLING MACHINE

William Hucal, Chicago, Ill.

Application July 3, 1936, Serial No. 88,892

26 Claims. (Cl. 90—13.6)

My invention relates to milling machines for producing irregularly shaped articles, but more particularly to milling machines for use in the production of propeller blades and by which the actual propeller blades, or patterns to be used in the manufacture of cast propellers, may be machine made.

My objects are to provide improvements in milling machines, in general, to the end of rendering them better adapted to perform the work for which they are provided; to provide improvements in machines by which propeller blades (and by which term as used in this application I intend to include patterns for cast propeller blades) may be manufactured and by an automatic operation, without requiring the preliminary production by hand, of a master pattern; and provision made for conditioning the machine for producing propeller blades having any desired degree of pitch with the angle of the blades, and thus the twist of the blade, progressively decreasing from the hub portion of the blade to its tip in accordance with standard propeller design, and also for producing different blade contours as desired; to provide for the shaping of both faces of each blade in a single operation of the machine; and other objects as will be manifest from the following description.

Referring to the accompanying drawings:

Figure 1 is a plan view of a machine constructed in accordance with my invention and shown as adapted for the making of separate propeller blades, the parts of the machine being shown in the position they assume upon starting the cutting operation.

Figure 2 is a view in side elevation partly sectional of the machine of Fig. 1, the view being taken at the irregular line 2 on Fig. 1 and viewed in the direction of the arrow.

Figure 3 is an enlarged broken sectional view showing the lathe center device or tail stock.

Figure 4 is an enlarged plan view of certain parts of the mechanism of Fig. 1.

Figure 5 is a view in end elevation, partly sectional, of the machine, the view being taken at the line 5 on Fig. 4 and viewed in the direction of the arrow.

Figure 6 is an enlarged sectional view taken at the line 6 on Fig. 5 and viewed in the direction of the arrow.

Figure 7 is a section taken at the lines 7 on Figs. 1 and 4 and viewed in the direction of the arrows.

Figure 8 is a section taken at the lines 8 on Figs. 4 and 7 and viewed in the direction of the arrows.

Figure 9 is an enlarged section taken at the line 9 on Fig. 4 and viewed in the direction of the arrow.

Figure 10 is an enlarged section taken at the line 10 on Fig. 4 and viewed in the direction of the arrow, with the parts shown in the positions they assume in the fashioning of the blade beyond the hub portion thereof.

Figure 11 is a plan section taken at the irregular line 11—11 on Fig. 10 and viewed in the direction of the arrow, the positioning of the parts being the same as in Fig. 10.

Figure 12 is a section taken at the line 12 on Fig. 10 and viewed in the direction of the arrow with the parts positioned as shown therein.

Figure 13 is a section taken at the line 13 on Fig. 4 and viewed in the direction of the arrow.

Figure 14 is a plan section taken at the lines 14 on Figs. 7 and 13 and viewed in the direction of the arrows.

Figure 15 is a fragmentary longitudinal view of the machine, showing certain parts in section, illustrating a more advanced position of the work relative to the milling cutter than shown in the preceding figures at which point in the operation of the machine bearing members for steadying the work are shown in engagement therewith.

Figure 16 is an edge view of a propeller blade produced on the machine of the preceding figures.

Figure 17 is a face view of the blade of Fig. 16.

Figure 18 is a section taken at the line 18 on Fig. 16 and viewed in the direction of the arrow.

Figure 19 is a section taken at the line 19 on Fig. 16 and viewed in the direction of the arrow.

Figure 20 is a section taken at the line 20 on Fig. 16 and viewed in the direction of the arrow.

Figure 21 is an end view of the blade of Figs. 16 and 17 viewing it from the right-hand side of these figures.

Figures 22–25 are views showing the relationship between the blade, at different portions therealong, and the corresponding portions of a cam forming a part of the machine and controlling the position of the milling cutter, the portions of the blades shown in Figs. 22, 23 and 24 being represented as those cut by the section lines 18, 19 and 20, respectively, on Fig. 16, and that shown in Fig. 25 being the tip of the blade; and Figs. 26, 27 and 28 are views in side elevation of the cam showing it as split transversely into three sections, with the sections spaced apart, the section of Fig. 26 being that part of the cam which controls the position of the cutter for forming the portion of the blade between the lines A and B on Fig. 16; the section of Fig. 27 being that part of the cam which controls the position of the cutter for forming the portion of the blade between the lines B and C on Fig. 16 and the section of Fig. 28 being that part of the cam which controls the position of the cutter for forming the portion of the blade between the lines C and D on Fig. 16.

As a preface to a description of the machine reference may here be made to the propeller blade structure illustrated in Figs. 16–21, inclusive, and which furnishes an example of structures as of wood which may be made by the machine: Figs. 16–21 show a propeller blade corresponding in shape with propeller blades as commonly provided, namely, flat in a direction crosswise thereof throughout a portion along its length at its rear face to its tip, as represented at 29, and cambered in a direction crosswise thereof throughout the remainder of said face, as represented at 30, and throughout the length of its front face as represented at 31, the blade being of twisted or spiral shape from near its hub portion 32 to its outer extremity 33 to cause the blade to present a predetermined pitch, with the angle of the blade progressively decreasing from its hub portion 32 to its tip 33 as illustrated and tapering at its opposite edges and in thickness toward its outer extremity as illustrated, the purpose of the machine, as applied to the production of propeller blades being to automatically form the blades of the length desired with the desired flat and camber tapered surfaces and of the desired pitch and decreasing angle of blade as above referred to.

Referring to the particular illustrated embodiment of my invention it comprises a stationary frame 34 secured to the top of a bed 35 and formed of a section 36 having ends 37 and 38 of platelike form extending crosswise of the machine and connected together by parallel side portions 39 spaced apart and containing parallel spaced apart guide openings 40 extending lengthwise of the machine through opposite ends of the portions 39, the platelike end portion 37 extending upwardly beyond the side portions 39; and end sections 41 and 42, the section 41 being secured to the end of the section 36 adjacent the plate end 37 and the section 42 secured to the section 36 at the opposite end of the latter and rising above the side portions 39.

Extending lengthwise of the machine is a carriage 43 for supporting the blank represented at 44 and from which the propeller blade is to be formed, the carriage being shown as formed of spaced apart parallel rods 45 which slide in the bores 40 of the stationary frame 34; and heads 46 and 47 at its opposite ends rigidly connected with the ends of the rods 45.

In the operation of producing the blade the carriage 43 is moved lengthwise of the machine while subjecting the blank to the action of a cutter hereinafter referred to, and to this end the carriage is provided with a screw shaft 48 rotated as hereinafter described and extending lengthwise of the carriage between, and parallel with, the rods 45 and journaled at its ends in the carriage heads 46 and 47 but held against lengthwise movement relative to the carriage by collars 51 and 52 secured thereto and located at opposite sides of the head 47 (Fig. 7), the shaft being partially housed within a sleeve 49 secured in an opening 50 in the end portion 38 of the frame 34, this shaft having threaded engagement with a nut 53 stationary on the frame end 37, the nut being secured to the part 37 by clamping it thereto between a shoulder 54 and a collar 55 threaded on the end of the nut.

The means shown for rotating the screw shaft 48 comprise a prime mover 56, as for example an electric motor (Fig. 1), the armature shaft of which carries a pinion 57 meshing with a gear 58 on a shaft 59 journaled in the frame section 41 and having a bevel gear 60 meshing with a bevel gear 61 secured to a shaft 62 journaled in the frame end 37 and carrying a pinion 63 rigid therewith and meshing with a gear 64 connected, through clutch mechanism 65, with a shaft 66 journaled in the frame end 37. The shaft 66 is journaled in a bushing 67 in the frame end 37 and its inner end is provided with a gear 68 fixed thereto and meshing with a gear 69 releasably connected with the screw shaft 48, as hereinafter described.

The clutch mechanism 65 comprises a ring 70 having a central boss 71 and rigidly secured to the shaft 66 between a shoulder 72 thereon and a nut 73 screwed on the outer end of this shaft, with a washer 74 interposed therebetween, the ring 70 containing diametrically opposed openings 75. Slidable on the boss 71 is a ring 76 having a peripheral groove 77 and a flange 78 at one end containing diametrically opposed openings 79 into which diametrically opposed pins 80 on the ring 76 slidingly extend, these pins, when the ring 76 is slid to the right in Fig. 7 entering diametrically opposed openings 81 in the gear 64 and clutching this gear to the shaft 66, the gear 64 being journaled on the bushing 67 between an annular shoulder 82 thereon and the ring 70.

The means shown for shifting the clutch pins 80 into and out of operative engagement with the gear 64 to clutch this gear to the ring 70, comprise a lever 83 having an opening 84 (Fig. 4) therethrough between its ends at which it loosely surrounds a lug 85 on the frame end 37 and to which it is pivoted by a pin 86. One end of the lever 83 is forked to provide arms 87 carrying a ring-segment 88 partially surrounding the ring 76 and having an annular inwardly extending flange 89 which extends into the groove 77 and by which connection the ring 76 may be shifted by the lever 83, the ring 76 being rotatable relative to this lever.

A spring 90 in a socket 91 in the lug 85 bearing against a plunger 92 in the socket and held against a pin 93 on the lever 83, serves to constantly urge this lever to clutched position. The lever is shown as releasably held in unclutched position, in opposition to the action of the spring 90, by an outwardly spring pressed bolt 94 slidable in a socket 95 in the lug 85 and adapted to enter a groove 96 in a pin 97 projecting from the lever 83, when this lever is swung to unclutched position. The lever 83 is released to permit it to swing to clutched position by shifting the bolt 94 out of engagement with the pin 97, a stud 98 on the bolt projecting outwardly through a slot 99 in the lug 85 being provided for this purpose.

The mechanism for releasably connecting the gear 69 to the screw shaft 48 comprises a sleeve 100 rotatable on the nut 53 and held against lengthwise displacement thereon by the frame end 37 and an annular shoulder 101 on the nut, the gear 69 being mounted on the inner end of this sleeve and of reduced diameter as represented at 102. A pin 103 slidable in an opening 104 in a flange 105 on the sleeve, enters one of a series of openings 106 in the gear 69 to provide driving connection between this gear and the sleeve. The pin 103 contains grooves 107 and 108 to receive a spring-pressed bolt 109 in a radial slot in the sleeve 100 for holding the pin 103 either in, or out of, engagement with the gear 69, as desired. Located in the outer enlarged end of the sleeve is a disk 110 which surrounds the screw shaft 48 and is secured to the sleeve 100 by screws 111, (Fig. 8) this disk having a radial slot 112 in which a key-forming member 113 is secured by a pin 114, the inner end of the key projecting into a keyway 115 in, and extending longitudinally of, the shaft 48, this shaft being slidable along the key 113 in the lengthwise movement of the carriage 43.

Mounted on the inner end member 46 of the carriage 43 is a lathe-center device, or tail stock device, 116 for an end of the blank 44, the tail stock being shown as comprising a threaded centering tool 117 engaging the internal threads of a tubular member 118 mounted in the carriage-end 46, and thus adjustable lengthwise in the member 118, with a lock nut 119 threaded on the tool for holding it in adjusted position.

Mounted on the other end member 47 of the carriage 43 are head-stock forming means for imparting slow rotation to the blank 44 during the feeding of the carriage 43 and while being operated on by the cutter referred to for producing the blade.

The blank-rotating head stock means referred to comprise (Figs. 7 and 14) a spindle 120 rotatably mounted in the end walls of a housing 121 secured to the carriage-end 47 and provided with a centering tool 122 for the adjacent head of the blank, the spindle 120 at its outer end being shown as provided with a disk 123 having diametrically opposed pins 124 projecting from a face thereof. These pins are provided to enter radial recesses 125 in the end of a socket member 126 applied to the hub-forming portion 127 of the blank 44 and held thereto by screws 128 on this socket member, and establishing driving connection between the spindle 120 and the blank 44, the pointed end of the centering tool 122 entering a central recess 129 in the end wall of the socket member 126.

Located in the housing 121 is a pair of meshing bevel gears 130 and 131, connected, respectively, with the spindle 120 and with a shaft 132 extending at an angle to the spindle 120 and journaled in a wall of the housing 121. The shaft 132 carries an arm 133 having a longitudinally extending groove therein into which a slide block 134 extends, this block being journaled on the inner end of a stud 135 having a head 136 and a flattened portion 137 at which it extends into a slot 138 in an upwardly extending member 139 rigidly secured at its lower end to the stationary member 42 to extend to one side of the shaft 132 as shown. The stud 135 is slidable in the slot 138 and is held in any desired position of adjustment therein by a nut 140 screwed on the outer end of the stud and against the member 139.

From the foregoing it will be understood that assuming the stud 135 to have been clamped to the member 139 the movement of the carriage 43 will cause the spindle 120, and therefore the blank 44, to be rotated, by reason of the swinging and sliding movement of the arm 133 on the stud 135, in timed relation to the movement of the carriage 43 but at a progressively decreasing speed.

The means for supporting and rotating the cutter hereinbefore referred to and represented at 141, and which operates, in the travel of the carriage 43 and the simultaneous rotation of the blank 44 as described, to cut the blade to shape, is supported and rotated, and the movement thereof controlled to shape the blade by means which will now be described.

Secured at one end in an opening 142 in the frame end 37 is a tubular member 143 extending lengthwise of the machine and concentrically alined with the head and tail stocks above referred to and through which the blank 44 extends, the member 143 being shown as secured to the frame end 37 by clamping it at a shoulder 144 and a screw ring 145 thereon, to this frame end.

Rotatably mounted on the tubular member 143 is a frame 146 comprising apertured end members 147 and 148 spaced apart, the end member 147 being journaled on a stepped bearing ring 150 screwed upon the outer end of the tubular member 143, and the end member 148 being shown as formed with a curved guard flange 152 concentric with the tubular member 143 and secured to the end member 147 as by screws 153, this frame being rotated by a gear 154 rigid with the end member 148 and meshing with the gear 68.

The frame 146 carries a yoke-like member 155 pivoted at its arm portions 156 and 157, which are connected by a bar 158, on a sleeve 159 secured at its ends in the end members 147 and 148 of the frame 146, the pivotal connection of the arm 157 with the sleeve 159 being at a stepped bearing member 167ª screwed upon this sleeve. The arm portion 156 which is in the form of a housing and journals on the sleeve 159 at a stepped nut 160 screwed on one end of this sleeve, is provided with a stud 161 forming a journal for a gear 162 to the hub 163 of which the cutter 141 is keyed as represented at 164, and on which it is held in place by a ring 165 screwed on the outer end of the hub 163. The gear 162 meshes with a gear 166 (Figs. 7 and 9) secured to the outer end of a shaft 167 journaled in bronze bearings 159ª in the ends of the sleeve 159, the other end of this shaft carrying a gear 168 which meshes with a gear 169 rotatably mounted on an annular stepped portion 170 of the end member 148 and shown as formed integrally with a gear 171 which meshes with a gear 172 (Fig. 6) rigid on the shaft 61.

The means now being described also comprise a cam device represented at 173 and stationarily mounted, as by a key 151, on the tubular member 143 between the end members 147 and 148; and means surrounding the cam and movable in contact therewith and lengthwise thereof in a spiral path for causing the cutter 141 to move toward and away from the blank 44 as the latter moves endwise and rotates and the cutter moves bodily around the blank, to cut the latter to the desired form of the propeller blade to be produced. These last referred to means comprise a roller 174 (Figs. 10, 11 and 12) engaging the cam 173 and journaled at 175 on a bar 176 shown as formed of similar plate sections 177 and 178 secured together and slidable at an aperture 179 therein along the bar 158. The rear end of the bar 176 is slotted at 180 to receive an end of a nut-forming bar 181 the latter being annularly recessed at its opposite sides as represented at 182 to form circular bosses 183 which extend through openings 184 in the plates 177 and 178 and form a pivotal connection between the bars 176 and 181. The bar 181 contains threaded apertures 185 and 186 which respectively engage the threads of parallel screw shafts 187 and 188 journaled in the rotary frame 146 and extending lengthwise of the machine and held against longitudinal movement, the shaft 188 being hollow and journaled on the sleeve 159.

The shafts 187 and 188, the thread on one of which is a right-hand thread and on the other a left-hand thread, are geared together to rotate in opposite directions by gears 189 and 190 (Fig. 4), whereby rotation of these shafts, by reason of the engagement thereof with the nut portions of the bar 181, moves the roller 174 lengthwise of the cam 173 in a direction depending on the direction in which these shafts are rotated.

The gear 189 on the shaft 188 meshes with a pinion 191 rigid with a gear 192 journaled on a stud 193 on the frame end 148, the gear 192 meshing with a stationary gear 194 surrounding the tubular member 143 and shown as held in place thereon by the key 151. Thus when the frame 146 is rotated the shafts 187 and 188 will be driven to feed the structure comprising the roller 174 and the bars 176 and 181 along the cam in a direction lengthwise thereof.

The yoke member 155 on which the cutter 141 is carried as described is constantly forced in a direction to maintain this roller in contact with the cam 173 at all times, by spring means shown as comprising a coil spring 195 located in a socket 196 in the bar 181 and bearing against a plunger 197 slidable in this socket and pivoted at 198 to a lever 199 which, in turn, is pivotally connected with the bar 176 eccentrically of the axis of the pivotal support of the latter, as represented at 200.

As will be understood from the foregoing, the motor 56 simultaneously rotates the means which slide the carriage 43 lengthwise, rotates the cutter 141 about its axis, rotates the frame 146 which carries the cutter and the cam-roller-supporting yoke 155 and thus bodily rotates the cutter around the blank 44 and the roller 174 around the cam 173 in engagement therewith, and rotates the screw shafts 187 and 188 on the rotary frame 146 which slides the bar 176 carrying the cam engaging roller 174, along the cam causing this roller to travel in a spiral path.

In the particular construction shown the cam 173 is provided of a length much less than the length of the blade to be formed, it being shown as about one-fourth as long as the blade, and thus the roller 174 must travel along the cam 173 at a speed proportionate to the proportion of the length of this cam to the length of the blade to be produced; accordingly, the size and pitch of the threads of the threaded shafts 187 and 188 and the gear driving these shafts will be proportioned to effect the proper speed of travel of the roller 174 along the cam.

As further explanatory of the cam 173 and its relation to the blade, reference is made to Figs. 22-28, inclusive, wherein the cam is shown as providing a cylindrical portion 201 at one end which, in cooperating with the roller 174, forms the cylindrical hub portion 32 of the blade, the remaining portion of the cam being of irregular contour as shown and cooperating with the roller to form the remainder of the blade; the portions of the cam shown in Figs. 26, 27 and 28 being those portions which cooperate with the roller to form the portions of the blade between the lines A—B, B—C, and C—D, respectively, the shape of the cam at the portions of the blades coincident with the lines 18, 19, 20 and 21 on Figs. 16 and 22-25, inclusive, being as represented in Figs. 22-25, inclusive.

In the sliding movement of the carriage 43 as above stated, assuming the stud 137 to be clamped in adjusted position along the arm 139, the shaft 132, through its sliding connection with the stud 137, rotates the spindle 120 and therefore the blank to cause the blade to be formed of predetermined spiral form, it being understood that by adjusting the stud 137 along the arm 139, the pitch of the spiral may be increased or decreased depending on the direction in which the stud is adjusted.

In the particular construction shown the carriage 43 which, as will be understood from the above, moves to the right in Fig. 1 in the cutting of the blade, is provided with a stop 202 so positioned as to be engaged by the lever 83 for shifting the latter out of clutched position to thereby stop the movement of the carriage upon completing the forming of the blade, the clutch lever becoming releasably locked in such position by the bolt 95.

The machine shown also comprises means for pressing against the partially formed blade adjacent the cutter 141 to minimize vibration or chatter during the cutting operation. These means comprise upper and lower rollers 203 and 204 journaled on the cross members 205 and 206, respectively, of yokes 207 and 208 having trunnions 209 and 210 journaled in the frame end 42, these yokes being geared together for movement in opposite directions by gears 211 and 212 secured to certain of the trunnions of these yokes. One of the trunnions 208 of the lower yoke is provided with an arm 213 carrying a weight 214 adjustable therealong by which the rollers 203 and 204 are constantly urged in opposite directions toward each other and thus toward the axis of the blank. As will be understood, as soon as the carriage 43 has fed the blank lengthwise a short distance, the rollers 203 and 204 engage the opposite sides of the partially formed blade exerting sufficient pressure against the latter from opposite sides thereof to prevent chattering, the provision of the parts of the particular machine shown being such that those surfaces of the formed portion of the blade which are in registration with the rollers 203 and 204 are disposed, along the entire length of the blade, at the same distance from the axis of rotation of the blank and thus both rollers exert substantially the same pressure against the partially formed blade. The rollers 203 and 204, arranged in substantially vertical alinement with the axis of rotation of the blank are transversely convexed at their peripheries as shown whereby the engagement thereof with the work is in the nature of a line contact which is necessary in view of the fact that these rollers engage with successive twisted or spiral portions of the blade as the latter is advanced between them by the carriage.

While a milling cutter is shown at 141, it is obvious that a grinding wheel may be substituted therefor. A wooden pattern, as for instance of an aeroplane propeller blade, may be produced with the milling cutter in place and using a cam to make the blade slightly over size. Metal castings may be made from this pattern, a grinding wheel and correct size of cam placed in the machine and the metal blades then accurately ground to size and form. The machine may operate purely as a grinding machine.

While I have illustrated and described a particular construction embodying my invention, I do not wish to be understood as intending to limit it thereto as the same may be variously modified and altered and the invention embodied in other forms of structure without departing from the spirit of my invention.

What I claim as new and desire to secure by Letters Patent, is:

1. In a machine of the character set forth, the combination of means for rotatably supporting a blank, cutter means for the blank, said first-named means and said cutter means being relatively movable in the direction of the length of the blank, means mounting said cutter means for bodily encircling movement around the blank and for movement crosswise of the blank, means for controlling the movement of said cutter means crosswise of the blank and means to cause relatively slow rotation of the blank on its axis during relative movement between said cutter and blank supporting means, whereby to vary the circumferential position of the effect of cross movements of said cutter.

2. In a machine of the character set forth, the combination of means for supporting a blank, cutter means for the blank, said first-named means and said cutter means being relatively movable in the direction of the length of the blank, means mounting said cutter means for bodily encircling movement around the blank and for movement crosswise of the blank, and a cam surrounding the blank for controlling the movement of said cutter means crosswise of the blank.

3. In a machine of the character set forth, the combination of means for supporting a blank, cutter means for the blank, said first-named means and said cutter means being relatively movable in the direction of the length of the blank, means mounting said cutter means for bodily encircling movement around the blank and for movement crosswise of the blank, a cam surrounding the blank, and means operatively engaging said cutter means and mounted to revolve around the blank in engagement with said cam for controlling the movement of said cutter means crosswise of the blank.

4. In a machine of the character set forth, the combination of means for rotatably supporting a blank, means for rotating said blank, cutter means for the blank, said first-named means and said cutter means being relatively movable in the direction of the length of the blank, means mounting said cutter means for bodily encircling movement around the blank and for movement crosswise of the blank, a cam surrounding the blank, and means operatively engaging said cutter means and mounted to revolve around the blank in engagement with said cam for controlling the movement of said cutter means crosswise of the blank.

5. In a machine of the character set forth, the combination of means for supporting a blank, cutter means for the blank, said first-named means and said cutter means being relatively movable in the direction of the length of the blank, means mounting said cutter means for bodily encircling movement around the blank and for movement crosswise of the blank, a cam surrounding the blank, means mounted to revolve around the blank in engagement with said cam for controlling the movement of said cutter means crosswise of the blank, said last-named means and said cutter means being relatively bodily movable in the direction of the length of the cam, and means for producing said last-referred-to relative movement.

6. In a machine of the character set forth, the combination of means for rotatably supporting a blank, means for rotating said blank, cutter means for the blank, said first-named means and said cutter means being relatively movable in the direction of the length of the blank, means mounting said cutter means for bodily encircling movement around the blank and for movement crosswise of the blank, a cam surrounding the blank, means mounted to revolve around the blank in engagement with said cam for controlling the movement of said cutter means crosswise of the blank, said last-named means and said cutter means being relatively bodily movable in the direction of the length of the cam, and means for producing said last-referred-to relative movement.

7. In a machine of the character set forth, the combination of means for supporting a blank, cutter means for the blank, said first-named means and said cutter means being relatively movable in the direction of the length of the blank, means mounting said cutter means for bodily encircling movement around the blank and for movement crosswise of the blank, a stationary cam surrounding the blank, means mounted to revolve around the blank in engagement with said cam for controlling the movement of said cutter means crosswise of the blank, said last-named means being bodily movable along the cam, and means for producing movement of said fourth-named means along the cam.

8. In a machine of the character set forth, the combination of means for supporting a blank and movable in a direction lengthwise of the blank, cutter means for the blank, means mounting said cutter means for bodily encircling movement around the blank and for movement crosswise of the blank, a stationary cam surrounding the blank, means mounted to revolve around the blank in engagement with said cam for controlling the movement of said cutter means crosswise of the blank, and means for moving said last-named means along the cam in timed relation to the lengthwise movement of the blank.

9. In a machine of the character set forth, the combination of means for rotatably supporting a blank, said means being movable lengthwise of the blank, means for rotating said blank, a stationary cam surrounding the blank, a rotatable support surrounding the blank, means for rotating said support, a rock-member on said support, cutter means mounted on said rock-member, a slide member on said rock-member and engaging said cam for controlling the rocking movement of said rock-member and movement of said cutter means crosswise of the blank, a threaded shaft journaled on said rotatable support, said slide member engaging the thread of said shaft, means yieldingly urging said slide member toward said cam, and means for rotating said shaft in timed relation to the movement of said first-named means lengthwise of the blank.

10. In combination, means for supporting a blank, cutting means for the blank, said blank and cutting means being relatively movable in a direction lengthwise of the blank, and means for preventing chattering of the blank comprising members pressing against opposite surfaces of formed portions of the blank adjacent said cutting means, said first-named means and said last-named means being relatively bodily movable in the direction of the length of the blank.

11. In combination, means for supporting a blank, cutting means for the blank, said blank and cutting means being relatively movable in a direction lengthwise of the blank, and means for preventing chattering of the blank comprising members mounted for movement against opposite surfaces of formed portions of the blank adjacent said cutting means, said first-named means and said last-named means being relatively bodily movable in the direction of the length of the blank, and means yieldingly pressing said members against said formed portions.

12. In combination, means for supporting a blank, cutting means for the blank, said blank and cutting means being relatively movable in a direction lengthwise of the blank, and means for preventing chattering of the blank comprising members mounted for movement against opposite surfaces of formed portions of the blank adjacent said cutting means, said first-named means and said last-named means being relatively bodily movable in the direction of the length of the blank, means connecting said members together for simultaneous movement in opposite directions, and means for causing said members to be yieldingly pressed against said formed portions.

13. In a machine of the character set forth, the combination of means for supporting a blank, cutter means for the blank, said first-named means and said cutter means being relatively movable in the direction of the length of the blank, means mounting said cutter means for bodily encircling movement around the blank and for movement crosswise of the blank comprising a rotatable support surrounding the blank and a rock member on said support and carrying said cutter means for movement crosswise of the blank, a stationary cam surrounding the blank, means for rotating said support and means on said rock member and engaging said cam for controlling the movement of said cutter means crosswise of the blank, said cutter means and said last-named means being relatively movable in the direction of the length of the blank.

14. In a machine of the character set forth, the combination of means for supporting a blank, cutter means for the blank, said first-named means and said cutter means being relatively movable in the direction of the length of the blank, means mounting said cutter means for bodily encircling movement around the blank and for movement crosswise of the blank comprising a rotatable support surrounding the blank and a rock member on said support and carrying said cutter means for movement crosswise of the blank, a stationary cam surrounding the blank, means for rotating said support, and a member mounted on, and slidable along, said rock member and engaging said cam for controlling the movement of said means crosswise of the blank.

15. In a machine of the character set forth, the combination of means for supporting a blank and movable in a direction lengthwise of the blank, cutter means for the blank, means mounting said cutter means for bodily encircling movement around the blank and for movement crosswise of the blank comprising a rotatable support surrounding the blank and a rock member on said support and carrying said cutter means for movement crosswise of the blank, a stationary cam surrounding the blank, means for rotating said support, means on said rock member and engaging said cam for controlling the movement of said cutter means crosswise of the blank, said last-named means being movable lengthwise of the blank, and means for moving said first-named means and said fifth named means simultaneously and in timed relation to each other.

16. In a machine of the character set forth, the combination of means for supporting a blank, cutter means for the blank, said first-named means and said cutter means being relatively movable in the direction of the length of the blank, means mounting said cutter means for bodily movement around the blank and for movement crosswise of the blank comprising a rotatable support surrounding the blank and a rock member on said support and carrying said cutter means for movement crosswise of the blank, a stationary cam surrounding the blank, means for rotating said support, means on said rock member and engaging said cam for controlling the movement of said cutter means crosswise of the blank, said cutter means and said last-named means being relatively movable in the direction of the length of the blank, and means yieldingly urging said last-named means toward said cam.

17. In a machine of the character set forth, the combination of means for supporting a blank, cutter means for the blank, said first-named means and said cutter means being relatively movable in the direction of the length of the blank, means mounting said cutter means for bodily movement around the blank and for movement crosswise of the blank comprising a rotatable support surrounding the blank and a rock member on said support and carrying said cutter means for movement crosswise of the blank, a stationary cam surrounding the blank, means for rotating said support, a slide member on said rock member and engaging said cam for controlling the movement of said cutter means crosswise of the blank, a threaded shaft journaled on said rotatable support, said slide member engaging the thread of said shaft, and means for rotating said shaft in timed relation to the relative movement of said first-named means and said cutter means.

18. In a machine of the character set forth the combination of means for supporting a blank and means for shaping the blank in a lengthwise direction and shaping it into non-circular shape in cross section comprising cutter means, said first-named means and said cutter means being relatively movable in the direction of the length of the blank, means mounting said cutter means for bodily encircling movement around the blank and for movement crosswise of the blank, and a cam for controlling the movement of said cutter means crosswise of the blank of a shape lengthwise for controlling the lengthwise shape of the article cut from the blank and of non-circular shape in cross section to control the cross sectional shape of the article.

19. In a machine of the character set forth the combination of means for supporting a blank and means for shaping the blank in a lengthwise direction and shaping it into non-circular shape in cross section comprising cutter means, said first-named means and said cutter means being relatively movable in the direction of the length of the blank, means mounting said cutter means for bodily encircling movement around the blank and for movement crosswise of the blank, and a stationary cam for controlling the movement of said cutter means crosswise of the blank of a shape lengthwise for controlling the lengthwise shape of the article cut from the blank and of non-circular shape in cross section to control the cross sectional shape of the article.

20. In a machine of the character set forth the combination of means for supporting a blank, and means for shaping the blank in a lengthwise direction and shaping it into non-circular shape in cross section comprising cutter means, said first-named means and said cutter means being relatively movable in the direction of the length of the blank, means mounting said cutter means for bodily encircling movement around the blank and for movement crosswise of the blank, a cam for controlling the movement of said cutter means crosswise of the blank of a shape lengthwise for controlling the lengthwise shape of the article cut from the blank and of non-circular shape in cross section to control the cross sectional shape of the article and means to cause relatively slow movement of rotation of the blank to vary the circumferential location of the non-circular shape produced.

21. In a machine of the character set forth the combination of means for supporting a blank, and means for shaping the blank in a lengthwise direction and shaping it into non-circular shape in cross section comprising cutter means, said first-named means and said cutter means being relatively movable in the direction of the length of the blank, means mounting said cutter means for bodily encircling movement around the blank and for movement crosswise of the blank, a cam of a shape lengthwise for controlling the lengthwise shape of the article cut from the blank and of non-circular shape in cross section to control the cross-sectional shape of the article, and means operatively engaging said cam and said fourth-named means for controlling the movement of said cutter means crosswise of the blank.

22. In a machine of the character set forth the combination of means for supporting a blank, and means for shaping the blank in a lengthwise direction and shaping it into non-circular shape in cross section comprising cutter means, said first-named means and said cutter means being relatively movable in the direction of the length of the blank, means mounting said cutter means for bodily encircling movement around the blank and for movement crosswise of the blank, a stationary cam of a shape lengthwise for controlling the lengthwise shape of the article cut from the blank and of non-circular shape in cross section to control the cross-sectional shape of the article and means operatively engaging said cam and said fourth-named means for controlling the movement of said cutter means crosswise of the blank.

23. In a machine of the character set forth the combination of means for supporting a blank, means for relatively slowly rotating the blank, and means for shaping the blank in a lengthwise direction and shaping it into non-circular shape in cross section comprising cutter means, said first-named means and said cutter means being relatively movable in the direction of the length of the blank, means mounting said cutter means for bodily encircling movement around the blank and for movement crosswise of the blank, a cam of a shape lengthwise for controlling the lengthwise shape of the article cut from the blank and of non-circular shape in cross section to control the cross-sectional shape of the article and means operatively engaging said cam and said fourth-named means for controlling the movement of said cutter means crosswise of the blank, said slow rotation acting to vary the circumferential location of the non-circular shape along the length of the blank.

24. In a machine of the character set forth, the combination of: means for supporting a blank; cutter means for the blank; means to cause relative movement between said cutter and supporting means lengthwise of the blank; means to cause relative circumferential movements of 360° each between the cutter and a blank supported by said supporting means during an amount of lengthwise movement not more than the width of cut; means to vary the distance of the cutter from the axis of the blank during at least some of said 360° movements; and further means to cause relative circumferential movement between the cutter and the blank of less than 360° during a plurality of said 360° movements; whereby to produce an article of a form non-circular in cross-sections throughout at least a portion of its length with the corresponding diameters of different sections standing in different radial planes through the axis of the article.

25. In a machine of the character set forth, the combination of: a stationary hollow cam with a length of a fraction of the length of the article to be produced; means to support a blank for movement through said cam; a cutter mounted for encircling movement around and crosswise movement relative to the axis of said cam in a fixed plane; means coacting with said cam and with said cutter to cause crosswise movement of the cutter in conformity to the shape of said cam; and means to move said blank supporting means and said coacting means at speeds in proportion to each other equal to said fraction.

26. In a machine of the character set forth, the combination of: a stationary hollow cam with a length of a fraction of the length of the article to be produced; means to support a blank for movement through said cam; a cutter mounted for encircling movement around and crosswise movement relative to the axis of said cam in a fixed plane; means coacting with said cam and with said cutter to cause crosswise movement of the cutter in conformity to the shape of said cam; means to move said blank supporting means and said coacting means at speeds in proportion to each other equal to said fraction, and means to cause relatively slow rotation of the blank during its longitudinal movement.

WILLIAM HUCAL.